United States Patent [19]
Pons et al.

[11] 3,894,152
[45] July 8, 1975

[54] USE OF (THIENYL-3)(3-N-MORPHOLINE-PROPY)KETONE

[75] Inventors: Andre Lucien Adrien Pons; Max Fernand Robba, both of Paris; Rene Henri, Espins; Pierre Marcy, Sartrouville, all of France

[73] Assignee: Innothera, Val de Marne, France

[22] Filed: Apr. 23, 1973

[21] Appl. No.: 353,362

Related U.S. Application Data

[62] Division of Ser. No. 72,496, Sept. 15, 1970, abandoned.

[30] Foreign Application Priority Data
Sept. 15, 1969 France ............................. 69.31306

[52] U.S. Cl. .............. 424/248; 424/244; 424/267; 424/274; 424/275
[51] Int. Cl.² ........................................ A61K 27/00
[58] Field of Search .................. 260/247.1, 570.5 C; 424/248

[56] References Cited
UNITED STATES PATENTS
3,189,600   6/1965   Huebner ............................. 260/239

*Primary Examiner*—Stanley J. Friedman
*Attorney, Agent, or Firm*—Stevens, Davis, Miller & Mosher

[57] ABSTRACT

Furyl, thienyl and thiazolyl compounds of general formula

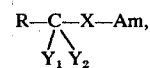

in in which R is furyl or thienyl linked in the 2 or 3 position or thiazole linked in the 2 position to the indicated carbon atom, X is a divalent aliphatic group having 2 or 3 carbons, $Y_1$ and $Y_2$ together are O or NOH or one is H and the other OH, and Am is an amino group which is a residue of certain amines, and the groups >C $Y_1$ $Y_2$ and Am being linked to the same or different carbon atoms of the group X, their pharmaceutically acceptable acid salts and quaternary ammonium salts have valuable therapeutic properties as neuroleptics, tranquillisers and analgesics.

1 Claim, No Drawings

USE OF (THIENYL-3)(3-N-MORPHOLINE-PROPY)KETONE

This is a division of application Ser. No. 72,496, filed 9/15/70, now abandoned.

This invention relates to new amino derivatives of furane, of thophene and of thiazole, having therapeutic value as neuroleptics, tranquillisers and analgesics, and to compositions containing the same.

According to the present invention there are provided furyl, thienyl and thiazolyl compounds of the general formula

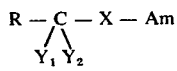

wherein R is a furyl or thienyl radical linked in the 2 or 3-position, or a thiazolyl radical linked in the 2-position, to the indicated carbon atom, X is a divalent aliphatic group having 2 or 3 carbon atoms, $Y_1$ and $Y_2$ together represent O or NOH or one of them is hydrogen and the other is hydroxy, and Am represents an amino group which is a residue of a primary or secondary amine selected from propylamine, isopropylamine, butylamine, isobutylamine, secondary butylamine, tertiary butylamine, dimethylamine, diethylamine, dipropylamine, di-isopropylamine, pyrrolidine, piperidine, morpholine and hexamethylene-imine, the groups $>C\ Y_1\ Y_2$ and — Am being linked to the same or different carbon atoms of the group X, pharmaceutically acceptable salts of the aforesaid furyl, thienyl and thiazolyl compounds formed with organic or inorganic acids, and pharmaceutically acceptable quarternary ammonium salts of the said furyl, thienyl and thiazolyl compounds.

Suitable acids for the formation of such salts are, for example, hydrochloric, hydrobromic, sulphuric, phosphoric, oxalic, maleic, fumaric, tartaric and citric acids. Suitable quarternary ammonium salts are, for example, the methyl bromide, methyl iodide and benzyl bromide.

The compounds of the foregoing formula may be made by three different methods.

1. by reaction of furyl-lithium, thienyl-lithium or thiazolyl-lithium with the appropriate amino nitrile.
2. by reaction of a primary or secondary amine with a furane, thiophene or thiazole derivative carrying a halogenated ketonic aliphatic substituent.
3. by reaction of an amine and formaldehyde with an acetyl or propionyl furane, thiophene or thiazole by the Mannich reaction.

In the first of these processes it is preferred to work in an anhydrous medium and in an atmosphere of nitrogen, preferably at low temperature. Thus the amino nitrile may be added to the organo-lithium compound and stirred at low temperature for several hours. By hydrolysing and acidifying the pH to 4 to 5 with acetic acid the amino ketone hydrobromide may be isolated. One can convert to the amino ketone by the action of an aqueous solution of sodium carbonate and extraction with an organic solvent, then converting the base to a salt with a mineral or organic acid or converting it to a quarternary ammonium salt.

The organo-lithium compound can be prepared by reaction of an alkyl-lithium with the furane, thiophene or thiazole derivative or by direct metallisation of the heterocyclic compound.

In accordance with the second process the brominated ketonic compound and the primary or secondary amine may be condensed in an alcoholic medium, e.g. in ethanol for example by allowing the reaction mixture to stand at ambient temperature for several hours.

To obtain the brominated ketonic compound, bromine in solution in chloroform or benzene may be reacted with the acyl derivative of furane, thiophene or thiazole. The position of linkage of the halogen on the acyl chain may be determined by nuclear magnetic resonance spectra.

The Mannich reaction may be carried out in the classical manner by warming to reflux for several hours in ethanol, a mixture of the acylated heterocyclic derivative, an amine hydrochloride and paraformaldehyde.

The oximes corresponding to the ketones may be obtained by warming to reflux, in ethanol, at a temperature of 80°C, a mixture of the ketone, hydroxylamine hydrochloride and potassium acid carbonate. The oxime may be isolated either in basic form by cooling the reaction mixture or transformed into a salt of mineral or organic acid.

To prepare the alcohols corresponding to the ketones, the ketonic group may be reduced to a secondary alcohol group, in methanol or ethanol solution, by treatment with sodium or potassium borohydride at ambient temperatures. The amino-alcohol produced is extracted with the aid of an organic solvent and the extract is dried by evaporating the solvent. The product may be converted to a salt by treatment with mineral or organic acid.

The following examples will serve to illustrate the invention. Temperature given are in degrees Centigrade.

EXAMPLE 1

(Thienyl-3) (γ-N-morpholino-propyl) ketone

A solution of n-butyl lithium is prepared under nitrogen at 0° to 5°, with 2 g of lithium and an anhydrous solution of 23 g of n-butyl bromide in 250 cc of ethyl ether. To this solution, stirred and cooled to −60°, is added drop by drop a solution of 14g of 3-bromo thiophene in 100 cc of ethyl ether. Stirring is continued for 1½ hours after the addition. There is then added, drop by drop, with stirring, a solution of 10g of 4-N-morpholino butyronitrile in 20 cc ethyl ether while maintaining the temperature at −50°. Stirring is effected for 4 hours at −50° and then hydrolysis is effected by a mixture of crushed ice and acetic acid in proportions such that the final pH of the aqueous solution is about 5. The ether is decanted and the precipitate which is formed in the aqueous phase after 24 hours in the ice box is removed. It is separated and dried. White crystals of the monohydrobromide of (thienyl-3)(γ-N-morpholino-propyl) ketone are thus obtained in a yield of 70% (m.p.165°).

The compound is crystallisable from absolute ethanol.

The hydrochloride of the compound presents itself in the form of white crystals (m.p. 175°) crystallisable from absolute ethanol. It is obtained in the following manner: the base is obtained from the hydrobromide by the action of an aqueous alkaline solution, extracted with chloroform, dried over sodium sulphite, evaporated to dryness in vacuo and the residue redissolved in ethyl ether, saturated with anhydrous hydrochloric acid and the precipitate separated.

The mono methyl iodide of the compound presents itself in the form of white crystals (m.p. 181°). It crystallises from absolute ethanol. It is prepared from the base in acetone solution by the action, at ambient temperature of a solution of methyl iodide in acetone.

The oxalate of the compound is obtained, in a yield of 90% by heating the base with zalic acid for 15 minutes, in acetone to reflux. It presents itself in the form of white crystals (m.p. 197°) and crystallises from methanol. The maleate (m.p. 105°) and fumarate (m.p. 125°) may be prepared in the same way.

EXAMPLE 2

(Thiazolyl-2)(γ-N-hexamethylene-imino-propyl) ketone

A solution of n-butyl lithium is prepared from 2.1 g of lithium and 21 g of n-butyl bromide in 100 cc of anhydrous ethyl ether and under nitrogen. It is cooled to −20°, 20 g of 2-bromothiazole dissolved in 50 cc of ethyl ether is added and stirring effected from 1 hour at 20°. It is cooled to −40° and there is added, with stirring, a solution of 20 g of 4-N-hexamethylene-imino-butyronitrile in 50 cc of ethyl ether. It is stirred for 12 hours and then poured onto 150 g of crushed ice. There is then added 10 cc of acetic acid to bring the pH to 4 and the precipitate is separated. It is dried and recrystallised from acetonitrile. White crystals (m.p. 195°) of (thiazolyl-2)(γ-N-hexamethylene-imino-propyl) ketone are obtained in a yield of 35%.

EXAMPLE 3

(Furyl-2)(α-tertiary butylamino-ethyl) ketone and its hydrochloride.

a. (Furyl-2)(α-bromo-ethyl) ketone

There is added, during an hour at 20°, 21 cc of bromine to a stirred solution of 2-propionyl furane in 100 cc of chloroform. Stirring is continued for two hours. The reaction mixture is placed in a decanting vessel and stirred with an aqueous solution of sodium carbonate, and a saturated aqueous solution of sodium chloride. The product is dried over sodium sulphate and distilled in vacuo. (Furyl-2)(α-bromo-ethyl) ketone is obtained, 60 g (yield 74%) in the form of a yellow oil (b.p/2mm 100°).

b. (Furyl-2) (α-tertiary-butylamino-ethyl) ketone and its hydrochloride

A solution of 4 cc of (furyl-2) (α-bromoethyl) ketone and 6 cc of tertiary butylamine in 50 cc of absolute ethanol are allowed to stand for 24 hours at ambient temperature. The product is evaporated to dryness in vacuo, an aqueous solution of sodium carbonate is added to the residue and stirred and the product is extracted with chloroform. It is dried over sodium sulphite and the base obtained is converted to its mono hydrochloride by saturation with anhydrous hydrochloric acid. White crystals are obtained (m.p. 222°) with a yield of 70%. The hydrochloride is recrystallised in absolute ethanol.

EXAMPLE 4

(Thienyl-3)(α-isopropylamino-ethyl) ketone a. (Thienyl-3)(α-bromo-ethyl) ketone

To a solution of 36 g of 3-propionyl thiophene in 100 cc of anhydrous benzene there is added, with stirring 15 cc of bromine during 1 hour at 20°. Stirring is continued for an hour at ambient temperature. The organic phase is washed with water and then with an aqueous solution of sodium carbonate. The solvent is eliminated and the residue distilled in vacuo. (Thienyl-3)(α-bromo-ethyl)ketone is obtained, 45 g (yield 80%) in the form of a yellow oil (b.p. 4mm 120°).

b. (Thienyl-3)(β-isopropylonino-ethyl)ketone

A solution of 4 cc of (thienyl-3)(α-bromoethyl) ketone and 6 cc of isopropylamine in 50 cc ethanol is allowed to stand for 24 hours at ambient temperature. After evaporation to dryness in vacuo there is added to the residue an aqueous solution of sodium carbonate and the product is extracted with chloroform. It is dried over sodium sulphate, the solvent removed, the residue re-dissolved in ethyl ether and transformed into its hydrochloride by saturation with anhydrous hydrochloric acid. The hydrochloride is obtained as white crystals (m.p. 225°) in a yield of 81%. It is recrystallised from absolute alcohol.

EXAMPLE 5

(Thiazolyl-2)(β-dimethylamino-ethyl)ketone

A mixture of 3 g of 2-acetyl thiazole, 2 g of dimethylamine hydrochloride, 1 g of paraformaldehyde and 2 drops of 10N hydrochloric acid in 30 cc of 96% ethyl alcohol is heated to reflux for 20 hours. It is concentrated to half-volume, cooled and 100 cc acetone is added. After leaving the solution for some hours in an ice-box, the crystals are separated and the product recrystallised from 96% ethyl alcohol. White crystals are obtained (m.p. 203°) in a yield of 45%.

EXAMPLE 6

(Thienyl-3)(γ-N-morpholino-propyl) ketoxime

A solution of 3.20 g of (thienyl-3)(γ-N-morpholino-propyl) ketone, 1.40 g of hydroxylamine hydrochloride and 3 g of acid potassium carbonate in 150 ml of 80% ethyl alcohol is heated to reflux for 45 minutes. After cooling, the product obtained is separated and recrystallised from ethyl ether. White crystals (m.p. 122°) are obtained in a yield of 70%. The base is converted to the mono hydrochloride by saturation of its solution in ethyl ether with gaseous anhydrous hydrogen chloride. White crystals are obtained (m.p. 179°); the hydrochloride crystallises in ethanol.

EXAMPLE 7

(Thienyl-2)(γ-isopropylamino-ethyl) carbinol

Sodium borohydride, 1.1 g, is added in 15 minutes at 0° to a solution of 5.90 g of (thienyl-2)(γ-N-isopropylamino-ethyl) ketone in 30 cc of methanol. After 1 hour stirring at 20° there is added 100 cc of water and the product is extracted with ether. The ether phase is dried over anhydrous sodium sulphate and the solvent then eliminated. The residue is dissolved in 40 cc of anhydrous ethyl ether and saturated with anhydrous hydrochloric acid. The hydrochloride obtained is separated and recrystallised from absolute ethanol. White crystals are obtained (m.p. 201°) in a yield of 81%.

EXAMPLE 8

(Thienyl-3)(γ-di-isopropylamino-propyl) methanol

Potassium borohydride, 0.16 g, is added to a solution of 5 g of (thienyl-3)(γ-di-isopropylamino-propyl) ketone in 30 cc of methanol and allowed to stand overnight at ambient temperature. After evaporation to dryness, 50 cc of water is added to the residue and the product is extracted with chloroform. The chloroform phase is dried over anhydrous sodium sulphate, the solvent is evaporated and the base obtained is converted to the hydrochloride. White crystals are obtained (m.p. 146°) in a yield of 80%: the hydrochloride crystallises from a mixture of ethanol and ethyl ether.

In Tables 1 to 3 there are set out the compounds prepared according to the foregoing Examples together with other compounds which can be obtained by the processes of preparation described.

TABLE 1

R — CO — X — Am

| Compound No. | R | X | Am | Compound nature | m.p. | Solvent of recrystallisation | Yield % |
|---|---|---|---|---|---|---|---|
| 1 |  | —CH—<br>\|<br>CH₃ | —NHCH(CH₃)₂ | hydrochloride | 227° | ethanol | 95 |
| 2 |  | —CH—<br>\|<br>CH₃ | —NHCH(CH₃)(C₂H₅) | hydrochloride | 201° | ethanol plus ethyl ether | 90 |
| 3 |  | —CH—<br>\|<br>CH₃ | —NHCH₂CH(CH₃)₂ | hydrochloride | 203° | ethanol | 75 |
| 4 |  | —CH—<br>\|<br>CH₃ | —NHC(CH₃)₃ | hydrochloride | 222° | ethanol | 70 |
| 5 |  | —CH—<br>\|<br>CH₃ | —NHCH(CH₃)₂ | hydrochloride | 225° | ethanol | 80 |
| 6 |  | —CH—<br>\|<br>CH₃ | —NHCH(CH₃)(C₂H₅) | hydrochloride | 210° | ethanol | 75 |
| 7 |  | —CH—<br>\|<br>CH₃ | —NHCH₂CH(CH₃)₂ | hydrochloride | 220° | ethanol | 50 |
| 8 |  | —CH—<br>\|<br>CH₃ | —NHC(CH₃)₂CH₂— (cyclopropyl type) | hydrochloride | 185° | ethanol | 65 |
| 9 |  | —(CH₂)₃— | —N(C₂H₅)₂ | hydrobromide | 48° | aceto-nitrile | 50 |
| 10 |  | —(CH₂)₃— | —N(C₃H₇(i))₂ | hydrobromide<br>methyl iodide | 98°<br>170° | acetonitrile plus ethyl ether<br>ethanol | 55 |
| 11 |  | —(CH₂)₃— | —N(pyrrolidinyl) | hydrobromide | 158° | acetonitrile | 65 |
| 12 |  | —(CH₂)₃— | —N(morpholinyl) | hydrobromide<br>hydrochloride<br>methyl iodide | 165°<br>175°<br>181° | ethanol<br>ethanol<br>ethanol | 70 |
| 13 |  | —(CH₂)₃— | —N(piperidinyl) | hydrobromide<br>hydrochloride | 210°<br>198° | ethanol<br>ethanol | 75<br>80 |
| 14 |  | —(CH₂)₃— | —N(methylpiperidinyl) | hydrobromide<br>hydrochloride | 223°<br>210° | acetonitrile<br>ethanol | 60<br>80 |
| 15 |  | —(CH₂)₂— | —N(CH₃)₂ | hydrochloride | 203° | 96% ethyl-alcohol | 45 |
| 16 |  | —(CH₂)₃— | —N(pyrrolidinyl) | hydrobromide | 170° | ethanol | 25 |
| 17 |  | —(CH₂)₃— | —N(piperidinyl) | hydrobromide | 207° | ethanol | 25 |
| 18 |  | —(CH₂)₃— | —N(morpholinyl) | hydrochloride | 210° | ethanol | 34 |
| 19 |  | —(CH₂)₃— | —N(methylpiperidinyl) | hydrobromide | 195° | ethanol | 35 |

TABLE 2

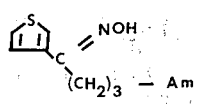
$$\text{structure with } (CH_2)_3 - Am$$

| Compound No. | Am | Compound Nature | m.p. | Solvent of recrystallisation | Yield % |
|---|---|---|---|---|---|
| 20 | −N(CH(CH₃)₂)₂ | base | 80° | ethanol | 60 |
| 21 | −N(pyrrolidine) | base / hydrochloride | 190° / 135° | ethanol | 80 |
| 22 | −N(piperidine) | base / hydrochloride | 150° / 170° | ethanol / ethanol | 70 |
| 23 | −N(morpholine) | base / hydrochloride | 122° / 179° | ethyl ether / ethanol plus ethyl ether | 70 |
| 24 | −N(C₂H₅)₂ | base / hydrochloride | 83° / 135° | ethyl ether / ethanol plus ethyl ether | 75 / 80 |
| 25 | −N(hexamethyleneimine) | hydrochloride | 197° | ethanol plus ethyl ether | 75 |

TABLE 3

R — CHOH — X — Am

| Compound No. | R | X | Am | Compound Nature | m.p. | Solvent of recrystallisation | Yield % |
|---|---|---|---|---|---|---|---|
| 26 | furyl | −CH(CH₃)− | −NHCH(CH₃)(C₂H₅) | hydrochloride | 148° | 96% ethyl alcohol | 65 |
| 27 | thienyl | −CH(CH₃)− | −NHCH(CH₃)₂ | hydrochloride | 201° | ethanol | 80 |
| 28 | thienyl | −CH(CH₃)− | −NHCH₂CH(CH₃)₂ | hydrochloride | 175° | ethanol | 70 |
| 29 | thienyl | −CH(CH₃)− | −NHC(CH₃)₃ | hydrochloride | 205° | ethanol | 70 |
| 30 | thienyl | −CH(CH₃)− | −NHCH(CH₃)(C₂H₅) | hydrochloride | 235° | ethanol | 90 |
| 31 | thienyl | −CH(CH₃)− | −NHCH(CH₃)₂ | hydrochloride | 162° | ethanol | 50 |
| 32 | thienyl | −CH(CH₃)− | −NHCH₂CH(CH₃)₂ | hydrochloride | 187° | ethanol | 80 |
| 33 | thienyl | −CH(CH₃)− | −NHCH(CH₃)(C₂H₅) | hydrochloride | 171° | ethanol | 75 |
| 34 | thienyl | −(CH₂)₃− | −N(C₂H₅)₂ | methiodide | 105° | ethanol | 60 |
| 35 | thienyl | −(CH₂)₃− | −N(iC₃H₇)₂ | hydrochloride | 146° | ethanol plus ethyl ether | 80 |
| 36 | thienyl | −(CH₂)₃− | −N(pyrrolidine) | hydrochloride | 113° | ethanol plus ethyl ether | 70 |

TABLE 3 — Continued

R — CHOH — X — Am COMPOUND

| Compound No. | R | X | Am | Nature | m.p. | Solvent of recrystallisation | Yield % |
|---|---|---|---|---|---|---|---|
| 37 | thiophene (S) | —(CH$_2$)$_3$— | —N(piperidine) | hydrochloride | 226° | ethanol plus ethyl ether | 70 |
|  |  |  |  | methiodide | 135° | ethanol |  |
| 38 | thiophene (S) | —(CH$_2$)$_3$— | —N(morpholine, O) | methiodide base | 157° 66° | ethanol ethyl ether | 65 |
| 39 | thiophene (S) | —(CH$_2$)$_3$— | —N(pyrrolidine) | hydrochloride | 228° | ethanol plus ethyl ether | 70 |

The compounds of the invention have been made the subject of a pharmacological study showing an activity localised at the level of the central nervous system and showing, in particular, the neuroleptic, tranquilising and analgesic properties of the compounds.

I. ACUTE TOXICITY

The acute toxicity of a number of the furan, thiophene and thiazole compounds chosen by way of example has been determined by the intraperitoneal route in the mouse. The calculation of the DL 50 has been effected by the method of MILLER and TAINTER (MILLER L. C., TAINTER, M. L. Proc. Soc. EXPTL. BIOL. MED. 1944 -57- 261, 264.)

In the particular case of the hydrobromide of (thienyl-3) (3-N-morpholinopropyl) ketone, the acute toxicity has been evaluated by intravenous, intraperitoneal, subcutaneous and oral routes, in the mouse, by the same method. The different results are presented in the tables which follow.

II. Potentialisation of experimental sleep in the mouse

The sedative activity of the furane thiophene and thiazole derivatives has been studied in the mouse by two techniques of potentialisation of experimental sleep induced by barbiturates.

A. Prolongation of experimental sleep

Sodium hexobarbital in 0.5% solution in an isotonic sodium chloride solution injected by the intraperitoneal route in the mouse at a dosage of 50 mg/kg, is not hynogenic.

The previous injection of neuroleptic or tranquillising substances leads, in the case of a number of the mice treated, to the appearance of sleep of variable intensity and duration according to the dose of the sedative administered.

The percentage of animals which sleep is noted.

The average duration of the latency time corresponds to the difference between the average time of injection of the sodium hexobarbital (A) and the average time of the loss of recovery reflex (B), thus (B) — (A).

The average duration of sleep corresponds to the difference between the average time of loss of recovery reflex (B) and the average time where the mice recover spontaneously (C), thus (C)-(B).

Tests have been effected comparatively with meprobanate, hydroxyzine and chlorpromazine chosen as the reference substances.

The different results obtained with certain derivatives studied by way of example are presented in the tables 8, 9 and 10 which follow, the average duration being calculated on the number of mice put to sleep.

B. Test for re-inducement to sleep

Sodium hexobarbital, in 0.8% solution in an isotonic sodium chloride solution, injected intraperitoneally at a dose of 80 mg kg, induces, in the five minutes which follow the injection, the appearance of sleep of duration varying from 15 to 30 minutes in 90–100% of the animals treated.

On awakening, the injection of neuroleptic or tranquillising substances, induces the re-sleeping of some of the animals. The latency time and the duration of the second period of sleep vary according to the size of the dose administered. The percentage of animals which resleep is noted.

The average duration of the latency time corresponds to the difference between the average time of injecting the products under test, immediately after the first awakening (D) and the average time of the second loss of recovery reflex (E), thus (E)—(D).

The average duration of the second sleep period corresponds to the difference between the average time of the second loss of recovery reflex (E) and the average time of the second awakening (F), thus (F)—(E).

The tests have been effected comparatively to chlorpromazine chosen as the reference neuroleptic.

The different results obtained with the derivatives studied by way of example are shown in the three tables which follow, the average duration being calculated on the number of mice induced to sleep or re-sleep.

III. Analgesic activity

The analgesic activity of the furane, thiophene and triazole compounds has been examined and illustrated in the mouse according to the following two techniques:

A. "Technique of the phenyl-paraquinone" of SEIGMUND, E.A., CADMUS A., Lu, G. J. Pharmacol Exp. Therapy, 1957, 119, 453.

This study has been effected relative to aminopyridine, as the reference analgesic. The different results obtained with certain compounds studied by way of Example, are presented in Tables 11, 12 and 13.

B. Hot plate test.

Mice placed in a Pyrex glass beaker immersed in a steam bath at 65° lick their fore-paws after 4 to 7 seconds exposure to the temperature. The previous administration of an analgesic substance retards the appearance of the licking reflex.

Morphine and amidopyrine hydrochlorides are used as reference analgesics.

The different results obtained with some typical derivatives are presented in Tables 14, 15, 16.

In tables 8 to 18 the tests have been effected on 10 animals for each dose.

TABLE 4

Type: R - CO - X - Am.

| Compound | DL50 mg/kg. |
|---|---|
| 1 | 245 ± 12 |
| 2 | 184 |
| 3 | about 300 |
| 4 | 158 ± 16 |
| 5 | 120 ± 15 |
| 6 | <166 |
| 7 | 162 |
| 8 | 165 ± 19 |
| 9 | 130 ± 10 |
| 10 hydrobromide | >100 |
| 11 | 60<DL50<66 |
| 12 hydrochloride | 230 ± 7 |
| 12 methiodide | 70<DL50<100 |
| 13 hydrobromide | 50<DL50<70 |
| 13 hydrochloride | 75 ± 10 |
| 14 hydrobromide | 50<DL50<70 |
| 14 hydrochloride | 85 ± 9.3 |
| 15 | >345 |
| 16 | 74 ± 4.1 |
| 17 | 77 ± 4.3 |
| 18 | >300 |
| 19 | about 83 |

TABLE 5

| 12 hydrobromide | i.p | 145 ± 5.4 |
|---|---|---|
| | i.p | 250 ± 6.6 |
| | s.c. | 500 ± 24.5 |
| | p.o. | 600 ± 6.7 |

TABLE 6

Type: 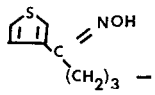

| 21 hydrochloride | 62 ± 4.1 |
|---|---|
| 22 hydrochloride | 62 ± 6.3 |
| 23 hydrochloride | about 180 |
| 24 hydrochloride | 110 ± 6 |
| 25 | 55<DL50<60 |

TABLE 7

Type: R — CHOH — X — Am

| Compound | DL 50 mg/kg. |
|---|---|
| 27 | 225 ± 24 |
| 28 | 190 ± 19 |
| 29 | 133 ± 9.5 |
| 30 | 130 ± 5.8 |
| 31 | >200 |
| 32 | 175 ± 11 |
| 33 | 155 ± 33 |
| 34 | 140 ± 15 |
| 36 | 200<DL50<300 |
| 37 hydrochloride | 50<DL50<100 |
| 37 methiodide | 100 ± 7 |
| 39 | 50<DL50<100 |

TABLE 8

Prolongation of experimental sleep in the mouse

The furan, thiophene and thiazole derivatives, the meprobanate, hydroxyzine and chlorpromazine were administered 30 minutes before the sodium hexobarbital.

(58 mg/kg - i.p. - Solution - 0.5%)

R - CO - X - Am

| Compound No. | Doses in mg/kg | Route | Conc. in g/100ml of solution | Percentage of animals put to sleep | Average duration of latency time | of sleep |
|---|---|---|---|---|---|---|
| 1 | 20 | s.c. | 0.20 | 20 | 6 mn 07 s | 7 mn |
|  | 30 | s.c. | 0.30 | 50 | 6 mn 05 s | 5 mn |
| 2 | 20 | s.c. | 0.20 | 70 | 4 mn 38 s | 17 mn |
| 3 | 50 | s.c. | 0.30 | 30 | 6 mn 41 s | 10 mn |
| 4 | 20 | s.c. | 0.20 | 50 | 4 mn 36 s | 7 mn |
| 5 | 20 | s.c. | 0.20 | 20 | 7 mn 15 s | 13 mn |
| 6 | 20 | s.c. | 0.20 | 60 | 4 mn 07 s | 17 mn |
| 7 | 20 | s.c. | 0.20 | 70 | 3 mn 55 s | 15 mn |
| 8 | 20 | s.c. | 0.20 | 30 | 3 mn 36 s | 7 mn |
| 9 | 15 | s.c. | 0.15 | 40 | 7 mn 03 s | 18 mn |
| 10 methiodide | 15 | s.c. | 0.15 | 50 | 5 mn 24 s | 6 mn 24 s |
| 11 | 15 | s.c. | 0.15 | 60 | 6 mn 57 s | 14 mn |
| 12 hydrochloride | 15 | s.c. | 0.15 | 100 | 4 mn 56 s | 12 mn |
| 12 hydrobromide | 20 | i.p. | 0.20 | 90 | 4 mn 33 s | 13 mn |
|  | 10 | s.c. | 0.10 | 50 | 10 mn 31 s | 23 mn |
|  | 15 | s.c. | 0.10 | 70 | 6 mn 51 s | 11 mn |
|  | 20 | s.c. | 0.10 | 90 | 6 mn 33 s | 21 mn |
|  | 50 | v.o. | 0.50 | 30 | 4 mn | 14 mn |
|  | 70 | v.o. | 0.50 | 80 | 5 mn 03 s | 22 mn |
| 13 hydrochloride | 15 | s.c. | 0.15 | 80 | 5 mn 02 s | 18 mn |
|  | 75 | v.o. | 0.75 | 70 | 5 mn | 14 mn |
| 14 hydrochloride | 15 | s.c. | 0.15 | 60 | 8 mn | 15 mn |
|  | 75 | v.o. | 0.75 | 70 | 4 mn 50 s | 20 mn |
| 15 | 20 | s.c. | 0.20 | 20 | 6 mn | 6 mn 30 s |
|  | 30 | s.c. | 0.30 | 60 | 7 mn 18 s | 4 mn 52 s |
| 16 | 20 | s.c. | 0.20 | 90 | 3 mn 58 s | 20 mn |
| 19 | 20 | s.c. | 0.20 | 70 | 7 mn 21 s | 6 mn |
| Procalmadiol | 20 | i.p. | 0.20 | 70 | 6 mn 22 s | 25 mn |
|  | 20 | s.c. | 0.20 | 60 | 6 mn 42 s | 26 mn |
| Hydroxyzine | 20 | i.p. | 0.20 | 80 | 5 mn 24 s | 34 mn |
|  | 20 | s.c. | 0.20 | 90 | 7 mn 01 s | 35 mn |
| Chlorpromazine | 2 | s.c. | 0.02 | 80 | 4 mn 05 s | 37 mn |

TABLE 9

Prolongation of experimental sleep in the mouse

The thiophene derivatives were administered 30 minutes before the sodium hexobarbital (50 mg/kg - i.p. - 0.5% solution)

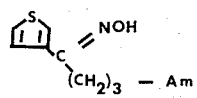

| Compound No. | Doses in mg/kg | Route | Conc. in g/100 ml of solution | percentage of animals put to sleep | Average duration | |
|---|---|---|---|---|---|---|
| | | | | | of latency time | of sleep |
| 20 | 30 | s.c. | 0.30 | 80 | 4 mn 37 s | 9 mn 22 s |
| 21 hydrochloride | 20 | s.c. | 0.20 | 100 | 2 mn 52 s | 36 mn |
| 22 hydrochloride | 15 | s.c. | 0.15 | 70 | 5 mn 12 s | 19 mn |
| | 20 | s.c. | 0.20 | 80 | 4 mn 41 s | 30 mn |
| | 75 | v.o. | 0.75 | 70 | 3     10 s | 37 mn |
| 23 hydrochoride | 20 | s.c. | 0.15 | 70 | 6 mn | 23 mn |
| | 50 | v.o. | 0.50 | 30 | 3 mn 40 s | 14 mn |
| | 75 | v.o. | 0.50 | 50 | 4 mn 45 s | 25 mn |
| 24 hydrochloride | 20 | s.c. | 0.20 | 50 | 3 mn 42 s | 15 mn |
| 25 | 20 | s.c. | 0.20 | 70 | 5 mn 23 s | 26 mn |
| chlorpromazine | 2 | s.c. | 0.02 | 90 | 3 mn | 35 mn |
| | 3 | i.p. | 0.03 | 100 | 1 mn 40 s | 50 mn |

TABLE 10

Prolongation of experimental sleep in the mouse

The furan and thiophene derivatives and the chlorpromazine were administered 30 minutes before the sodium hexobarbital (50 mg/kg - i.p. - 0.5% solution)

R — CHOH — X — Am

| Compound No. | Doses in mg/kg | Route | Conc. in g/100 ml of solution | Percentage of animals put to sleep | Average duration | |
|---|---|---|---|---|---|---|
| | | | | | of latency time | of sleep |
| 26 | 30 | s.c. | 0.30 | 20 | 5 mn | 6 mn |
| 27 | 20 | s.c. | 0.20 | 60 | 7 mn 08 s | 10 mn |
| 28 | 20 | s.c. | 0.20 | 50 | 4 mn 03 s | 17 mn |
| 29 | 30 | s.c. | 0.30 | 60 | 4 mn 57 s | 8 mn 01 s |
| 30 | 20 | s.c. | 0.20 | 60 | 6 mn 35 s | 16 mn |
| 31 | 20 | s.c. | 0.20 | 30 | 5 mn 20 s | 11 mn |
| 32 | 20 | s.c. | 0.20 | 30 | 6 mn 15 s | 28 mn |
| 33 | 20 | s.c. | 0.20 | 40 | 7 mn 26 s | 14 mn |
| 34 | 15 | s.c. | 0.15 | 40 | 7 mn 15 s | 6 mn |
| 37 | 15 | s.c. | 0.15 | 20 | 5 mn | 8 mn |
| Methiodide | 75 | v.o. | 0.75 | 60 | 8 mn 15 s | 17 mn |
| 38 | 15 | s.c. | 0.15 | 80 | 3 mn 45 s | 11 mn |
| Methiodide | | | | | | |
| 39 | 30 | s.c. | 0.30 | 60 | 3 mn 25 s | 16 mn |
| Chlorpromazine | 2 | s.c. | 0.02 | 100 | 1 mn 26 s | 44 mn |

TABLE 11

Test for re-inducement of sleep in the mouse

The thiophene and thiazole derivatives and the chlorpromazine and the isotonic NaCl solution were administered subcutaneously immediately after the first awakening.

$$\underset{\substack{\| \\ C-(CH_2)_3-Am}}{\overset{S}{\bigcap}} \overset{NOH}{}$$

| Compound No. | Doses in mg/kg | Conc. in g/100ml of solution | First sleep, after injection of sodium hexebarbital (80 mg/kg -i.p.) | | | Second sleep after injection of the test compound | | |
|---|---|---|---|---|---|---|---|---|
| | | | Percentage of animals put to sleep | Average Duration of latency time | of sleep | Percentage of animals put to sleep | Average Duration of latency time | of sleep |
| 21 hydrochloride | 15 | 0.15 | 100 | 2 m 38 s | 15 mn | 100 | 6 mn 09 s | 27 mn |
| 22 hydrochloride | 10 | 0.10 | 100 | 2 mn 42 s | 17 mn | 90 | 4 mn 05 s | 22 mn |
| 23 hydrochloride | 20 | 0.20 | 90 | 2 mn 49 s | 20 mn | 90 | 3 mn 33 s | 29 mn |
| 25 | 15 | 0.15 | 90 | 2 mn 28 s | 17 mn | 90 | 5 mn 33 s | 31 mn |
| isotonic solution of NaCl | 10 ml/kg | — | 100 | 3 mn 39 s | 18 mn | 0 | — | — |

TABLE 12

Test for re-inducement of sleep in the mouse

The thiophene and the isotonic solution of NaCl were administered subcutaneously immediately after the first awakening

| | R — CO — X — Am | | | | | | | |
|---|---|---|---|---|---|---|---|---|
| Compound No. | Doses in mg/kg | Conc. in g/100ml of solution | First sleep, after injection of sodium hexobarbital (80 mg/kg -i.p.) | | | Second sleep after injection of the test compound | | |
| | | | Percentage of animals put to sleep | Average Duration of latency time | of sleep | Percentage of animals put to sleep | Average Duration of latency time | of sleep |
| 9 | 20 | 0.20 | 100 | 3 mn 41 s | 2 mn 36 s | 70 | 9 mn 51 s | 22 mn |
| 11 | 20 | 0.20 | 100 | 2 mn 53 s | 9 mn 36 s | 90 | 10 mn | 30 mn |
| 12 | 5 | 0.05 | 100 | 3 mn 36 s | 29 mn | 50 | 8 mn | 8 mn |
| hydrobromide | 10 | 0.10 | 100 | 4 mn 26 s | 17 mn | 90 | 4 mn 15 s | 17 mn |
| | 20 | 0.10 | 100 | 3 mn 52 s | 20 mn | 90 | 2 mn 40 s | 19 mn |
| 13 | 10 | 0.10 | 100 | 3 mn 16 s | 29 mn | 50 | 4 mn 12 s | 26 mn |
| hydrochloride 14 | 10 | 0.10 | 100 | 2 mn 57 s | 32 mn | 60 | 2 mn 50 s | 26 mn |
| hydrochloride 16 | 20 | 0.20 | 100 | 3 mn 28 s | 15 mn | 30 | 3 mn 40 s | 15 mn |
| Chlorpromazine | 2 | 0.02 | 100 | 5 mn 16 s | 20 mn | 100 | 3 mn 18 s | 22 mn |
| | 2 | 0.02 | 100 | 3 mn 02 s | 15 mn | 80 | 2 mn 22 s | 22 mn |
| isotonic solution of NaCl | 10 ml/kg | — | 100 | 4 mn 27 s | 23 mn | 0 | — | — |
| | 10 ml/kg | — | 100 | 2 mn 11 s | 16 mn | 0 | — | — |

TABLE 13

Test for re-inducement of sleep in the mouse

The thiophene derivatives and the isotonic solution of NaCl were administered subcutaneously immediately after the first awakening

| | R — CHOH — X — Am | | | | | | | |
|---|---|---|---|---|---|---|---|---|
| Compound No. | Doses in mg/kg | Conc. in g/100ml solution | First sleep, after injection of sodium hexobarbital (80 mg/kg -i.p.) | | | Second sleep after injection of the test compound | | |
| | | | Percentage of animals put to sleep | Average Duration of latency time | of sleep | Percentage of animals put to sleep | Average Duration of latency time | of sleep |
| 27 | 30 | 0.30 | 100 | 3 mn 48 s | 14 mn | 60 | 2 mn 50 s | 8 mn |
| 37 hydrochloride | 20 | 0.20 | 90 | 5 mn 22 s | 19 mn | 30 | 9 mn 13 s | 18 mn |
| 39 | 20 | 0.20 | 90 | 3 mn 50 s | 27 mn | 30 | 7 mn 16 s | 11 mn |
| isotonic solution of NaCl | 10 ml/kg | — | 100 | 3 mn 39 s | 18 mn | 0 | — | — |

TABLE 14

Test to phenylparaquinone in the mouse

The thiophene, thiazole and furane derivatives, and the amidopyrine were administered subcutaneously 30 minutes before the phenylparaquinone (P.P.Q) - (0.2 ml per mouse - i.p. - 0.02g/100ml solution)

| | | R — CO — X — Am | | |
|---|---|---|---|---|
| Compound No. | Doses in mg/kg | Conc. in g/100 ml of solution | Percentage of reduction of the number of S.D.* for each interval of time (t) expressed in minutes (mn) | |
| | | | 5<t<10 | 10<t<15 |
| 1 | 30 | 0.3 | 48 | 72 |
| 2 | 30 | 0.3 | 33 | 66 |
| 9 | 20 | 0.20 | 75 | 67 |
| 11 | 20 | 0.10 | 97 | 90 |
| 12 | 10 | 0.10 | 61 | 55 |
| hydrobromide | 15 | 0.15 | 55 | 36 |
| | 25 | 0.25 | 93 | 78 |
| 13 hydrochloride | 15 | 0.15 | 55 | 20 |
| 14 hydrochloride | 15 | 0.15 | 45 | 32 |
| 16 | 20 | 0.20 | 36 | 40 |
| Amidopyrine | 10 | 0.10 | 45 | 40 |
| | 10 | 0.10 | 62 | 47 |
| | 25 | 0.25 | 43 | 53 |

*S.D. Syndrome sickness induced by the injection intraperitonealy of phenylparaquinone.

TABLE 15

Test to phenylaraquinone in the mouse

The thiophene derivatives and the amidopyrine were administered subcutaneously 30 minutes before the phenylparaquinone (P.P.Q.) - (0.25 ml per mouse - i.p. - 0.02 g/100 ml)

TABLE 17

Heated Plate test, in the mouse

The thiophene derivatives, amidopyrine and isotonic solution of NaCl were administered intraperitoneally 30 minutes before exposure of the mouse to the heated plate.

| | | R — CO — X — Am | | |
|---|---|---|---|---|
| Compound No. | Doses in mg/kg | Conc. in g/100 ml of solution | Average duration of exposure in seconds | Prolongation of the average duration of exposure in seconds |
| 9 | 50 | 0.5 | 13.6 | +6.7 |
| 10 hydrobromide | 50 | 0.5 | 10.2 | +3.3 |
| 11 | 50 | 0.5 | 22.5 | +15.6 |
| 12 hydrobromide | 50 | 0.5 | 10.6 | +3.7 |
| 13 hydrochloride | 50 | 0.5 | 18.4 | +11.5 |
| 14 hydrochloride | 50 | 0.5 | 19.4 | +12.5 |
| Amidopyrine | 100 | 1.0 | 14.2 | +7.3 |
| isotonic solution of NaCl | 10 ml/kg | — | 6.9 | — |

| Compound No. | Doses in mg/kg | Conc. in g/100 ml of solution | Percentage of reduction of the number of S.D.* for each interval of time (t) expressed in minutes (mn) | |
|---|---|---|---|---|
| | | | 5<t<10 | 10<t<15 |
| 21 oride | 10 | 0.10 | 70 | 43 |
| 22 hydrochloride | 20 | 0.20 | 97 | 87 |
| 23 hydrochloride | 20 | 0.20 | 96 | 53 |
| 24 hydrochloride | 20 | 0.20 | 40 | 15 |
| 25 | 10 | 0.10 | 55 | 54 |
| Amidopyrine | 10 | 0.10 | 62 | 47 |
| | 20 | 0.20 | 63 | 66 |

*S.D. Syndrome sickness induced by the injection intraperitonealy of phenylparaquinone.

TABLE 16

Test of phenylparaquinone in the mouse

The thiophene derivatives and the amidopyrine were administered subcutaneously 30 minutes before the phenylparaquinone (P.P.Q) - (0.25 ml per mouse - i.p. - 0.02 g/100 ml)

TABLE 18

Heated plate test, in the Mouse

The thiophene derivatives, morphine hydrochloride and isotonic solution of NaCl were administered subcutaneously 30 minutes before the exposure of the mouse to the heated plate.

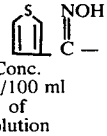

| Compound No. | Doses in mg/kg | Conc. in g/100 ml of solution | Average duration of exposure in seconds | Prolongation of the average duration of exposure in seconds |
|---|---|---|---|---|
| 21 hydrochloride | 20 | 0.20 | 17.3 | + 11.2 |
| 22 hydrochloride | 20 | 0.20 | 11.6 | + 5.5 |
| 23 hydrochloride | 20 | 0.20 | 8.5 | + 2.4 |
| 24 hydrochloride | 20 | 0.20 | 8.9 | + 2.8 |
| 25 | 20 | 0.20 | 15.6 | + 9.5 |
| morphine hydrochloride | 20 | 0.20 | 12.5 | + 6.4 |
| isotonic solution of NaCl | 10 ml/kg | — | 6.1 | — |

R — CHOH — X — Am

| Compound No. | Doses in mg/kg | Conc. in g/100 ml of solution | Percentage of reduction of the number of S.D. * for each interval of time (t) expressed in minutes (mn) | |
|---|---|---|---|---|
| | | | 5<t<10 | 10<t<15 |
| 27 | 30 | 0.30 | 45 | 72 |
| 34 | 20 | 0.20 | 38 | 45 |
| 37 hydrochloride | 20 | 0.20 | 47 | 62 |
| 37 methiodide | 10 | 0.10 | 60 | 32 |
| 39 | 10 | 0.10 | 48 | 29 |
| Amidopyrine | 10 | 0.10 | 45 | 40 |
| | 20 | 0.20 | 63 | 66 |

* S.D. Syndrome sickness induced by the injection intraperitonealy of phenylparaquinone.

The new compounds of the invention may be used in therapy by reason of their neuroleptic, tranquillising analgesic properties for the treatment of functional nerve troubles. In particular they may be administered in the following different nervous and algesic conditions:

nervous tension, hyperemotivity, instability psychosis in ordinary life (anxiety, distress, nervousness, irritability).

major functional troubles due to psychic tension: digestive troubles (spasms, aching), cardiovascular troubles (precardiac pain) and gynecological troubles (pre-menstrual syndromes)

The new derivatives may be presented for oral, endorectal or parenteral administration in man and animals, particularly in association with excipients appropriate to these routes. Thus, for example, they can be presented in the form of tablets, capsules, cachets, drinkable solutions, suppositories or injectable solutions. The invention includes, accordingly, pharmaceutical compositions which comprise one or more of these new derivatives.

The dosage unit may, as required, contain 50 to 500 mg of active substance.

The following pharmaceutical compositions are given by way of example:

Example A Tablets

| | | |
|---|---|---|
| (Thienyl-3) (γ-N-Morpholino-propyl) ketone hydrobromide | 0.200 | g |
| Lactose | 0.100 | g |
| Magnesium stearate | 0.005 | g |

Example B Drinkable solution

| | | |
|---|---|---|
| (Thienyl-3) (γ-N-morpholino-propyl) ketone hydrobromide | 10 | g |
| Distilled water to make | 100 | ml |

Example C Injectable solution

| | | |
|---|---|---|
| (Thienyl-3) (γ-N-morpholino-propyl) ketone hydrobromide | 0.050 | g |
| Distilled water to make | 5 | ml |

We claim as our invention:

1. A process for the treatment of a patient to induce a neuroleptic, tranquilizing or analgesic effect which comprises administering to the patient 50 to 500 mg of (thienyl-3) (3-N-morpholino-propyl) ketone and a pharmaceutically acceptable diluent.

* * * * *

UNITED STATES PATENT AND TRADEMARK OFFICE
CERTIFICATE OF CORRECTION

PATENT NO. : 3,894,152
DATED : July 8, 1975
INVENTOR(S) : Andre Lucien Adrien PONS et al It is certified that error appears in the above-identified patent and that said Letters Patent are hereby corrected as shown below:

The names of the third and fourth inventors should be corrected to read:

--Rene Henri Pierre Marcy of Espins
and
Denise Jeanne Claude Duval of Satrouville--

Signed and Sealed this twentieth Day of April 1976

[SEAL]

Attest:

RUTH C. MASON
*Attesting Officer*

C. MARSHALL DANN
*Commissioner of Patents and Trademarks*